W. E. BARTON.
SAFETY APPLIANCE.
APPLICATION FILED MAR. 22, 1910.

1,022,119.

Patented Apr. 2, 1912.

WITNESSES:
M. E. O'Neill
Ed E. Claussen.

INVENTOR.
William E. Barton,
BY Chas. F. Schmelz
ATTORNEY.

UNITED STATES PATENT OFFICE.

WILLIAM E. BARTON, OF HARTFORD, CONNECTICUT.

SAFETY APPLIANCE.

1,022,119.  Specification of Letters Patent.  Patented Apr. 2, 1912.

Application filed March 22, 1910. Serial No. 550,922.

*To all whom it may concern:*

Be it known that I, WILLIAM E. BARTON, a citizen of the United States, and resident of Hartford, in the county of Hartford and State of Connecticut, have invented certain new and useful Improvements in Safety Appliances, of which the following is a full, clear, and exact specification.

This invention relates to safety appliances, and more especially to check valves which are normally held open and which are permitted to close either gravitatively or by extraneous means whenever certain conditions in the supply pipe may exist.

More particularly, the present device is adapted for use in connection with gas meters and the supply pipes therefor, so that, in case of fire the heat thereof will become instrumental in releasing the valve or a constituent member thereof, so that the valve can then close and stop the flow of gas from the supply pipe.

The invention has for one of its objects, the provision of an improved device of this character as will hereinafter appear, and the means for the attainment of which will be particularly pointed out in the claim.

The invention has been clearly illustrated in the accompanying drawings in which—

Figure 1:
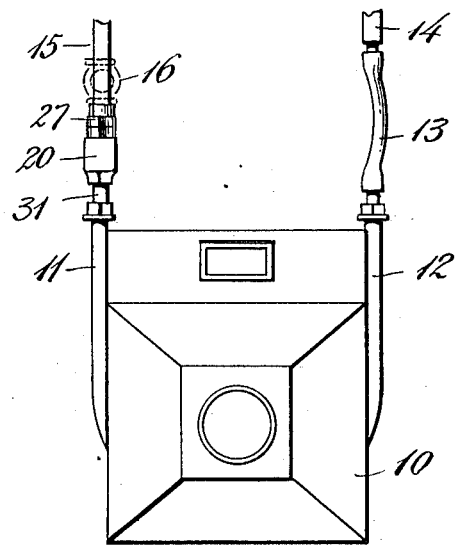
Figure 2:
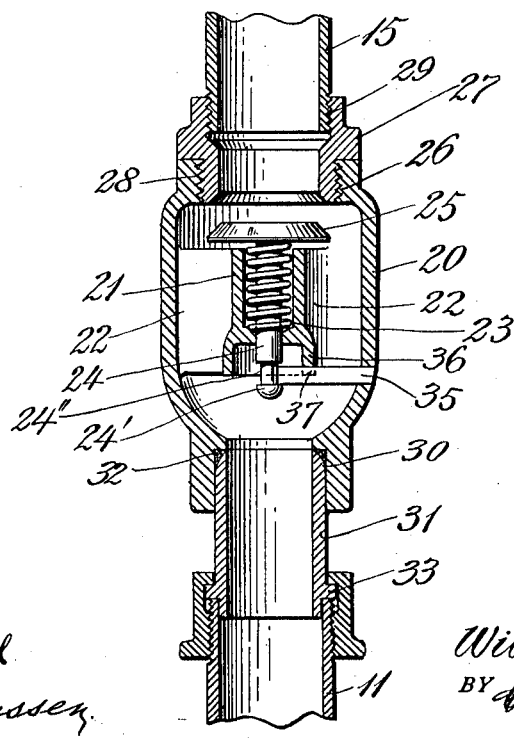

Figure 1 illustrates a gas-meter, together with its connections and having my improved appliance attached thereto, and Fig. 2 is a central vertical section through my improved device.

It has been the experience at fires in houses, business-blocks, factories, etc., that the fire started in the cellar where gas-meters are generally located, the heat generated frequently fuses the lead-pipe connections between the iron supply pipe and the meter, so that consequently, the gas could find a free and unobstructed exit from the supply pipe, and was in this manner able to feed the flames and consequently increase the fire damage beyond the limits which under ordinary conditions it would have reached. The particular object of the present invention, therefore, is to provide an appliance or check valve which may be securely attached to the iron supply pipe and closely adjusted to the meter, the mechanism being so constructed that when the temperature surrounding the gas-meter reaches a certain degree, the valve will be released and automatically closed to stop the flow of gas from the supply pipe. It will, therefore, be evident that no particular damage can result even if the other lead-pipe connections should be melted or otherwise broken, it being, furthermore, understood that the particular device whereby the valve retained in its normally-open condition, will be made of a readily fusible material irrespective of the fact whether the device controls the valve directly or indirectly.

In the drawings, the numeral 10 denotes a gas-meter which may be of any ordinary construction, and has an inlet-pipe 11 and an outlet-pipe 12 which latter may be connected by a lead-pipe 13 with the "house-pipe" 14 in any suitable manner.

The numeral 15 denotes the main-pipe to be connected with the inlet-pipe 11 and in the present instance I prefer to form this connection without the intervention of a lead-pipe and without employing a plug or other stop-cock which may be turned off or on by hand and whereby the main-pipe 15 may be shut off in case it is desired to remove the meter therefrom. On the other hand, it should be understood that my present device may be used in combination with such stop-cock when desired, as is for instance indicated by dotted lines 16 in Fig. 1. Inasmuch as the present invention is confined strictly to the automatic check-valve above referred to, any further description of the stop-cock is deemed unnecessary.

Referring to Fig. 2 it will be seen that my improved device comprises a casing 20 having a centrally-disposed cylindrical barrel 21 properly supported in position by radial ribs 22 which are preferably cast integral with the casing 20 and the barrel 21. The central portion of the barrel 21 is bored large enough to serve as a recess in which is seated a spring 23 which surrounds the stem 24 of a valve preferably cone-shaped and which may be closed by the spring 23 against a seat 26 formed in a preferably removable part 27 which has a screw threaded connection 28 with casing 20, and which is also screw threaded at 29 to rigidly unite the same with the main supply-pipe 15. The lower end of the casing 20 is recessed, as at 30, to receive the "meter union" 31 which is preferably soldered in place as at 32 and the lower end of which has a nut 33 whereby said union will be drawn into tight contact with the inlet-pipe 11 as clearly shown in Fig. 2.

Inasmuch as the present device is intended to operate automatically to close the valve whenever the temperature surrounding the casing reaches a certain point, means are provided whereby the valve 25 is held normally-open and which in the present instance preferably act directly upon the valve-stem 24, it being considered immaterial, however, to the proper operation of the device, in which particular manner the valve 25 is held thus normally-open provided that a readily fusible material forms one of the component elements of such device. In the present instance this device is illustrated as a wire 35 made of material which will fuse at a low temperature and the inner end of which engages a head 24' formed on the valve-stem 24 which latter is grooved as at 24'' to permit sufficient engagement between the wire and the head on the valve stem. In its preferred construction, the barrel 21 has an annular flange 36 which may be notched to receive the wire 35 which latter projects through the outside of the casing 20 and may be soldered thereto.

The operation of the device is obvious, it being understood that even if only a very small portion of the end of the wire 35 is fused, the inner portion of said wire will be released and the spring 23 will become effective in closing the valve 25 against its seat 26.

Many changes may be made in the construction and general organization of the device, without departing from the spirit of the invention, and I wish it distinctly understood that I do not confine myself to the particular combination of the devices herein shown. Neither do I confine myself to the employment of a fusible wire in combination with the valve, or to the spring-actuated valve which in some instances may be gravitative when so desired. Furthermore, it will be understood that the invention is applicable to supply-pipes of other danger-producing fluids, so that as a matter of fact, the invention can be advantageously used in many and various forms.

I claim:—

The combination with a supply pipe of a normally-open and tending-to-close valve having a stem provided with a head, a cylindrical barrel having ribs formed integral therewith for guiding the movement of said valve, said ribs connecting the barrel to the supply pipe, a spring surrounding said valve stem within said barrel and tending to close the valve and a wire in engagement with said stem at one end and having its opposite end secured to the casing for holding said valve in its open position against the tension of the spring and having a portion which is fusible at a certain degree of temperature to release said valve.

WILLIAM E. BARTON.

Witnesses:
C. F. Schmelz,
M. E. O'Neill.

---

Copies of this patent may be obtained for five cents each, by addressing the "Commissioner of Patents, Washington, D. C."